United States Patent [19]

Nguyen

[11] E Patent Number: Re. 33,217

[45] Reissued Date of Patent: May 15, 1990

[54] BUCKLE RESISTANCE FOR METAL CONTAINER CLOSURES

[75] Inventor: Tuan A. Nguyen, Thornton, Colo.

[73] Assignee: Ball Corporation, Muncie, Ind.

[21] Appl. No.: 235,787

[22] Filed: Aug. 19, 1988

Related U.S. Patent Documents

Reissue of:

[64] Patent No.: 4,577,774
Issued: Mar. 25, 1986
Appl. No.: 711,001
Filed: Mar. 12, 1985

U.S. Applications:

[60] Continuation of Ser. No. 56,611, Jun. 1, 1987, abandoned, which is a continuation of Ser. No. 565,995, Dec. 27, 1983, abandoned, which is a division of Ser. No. 357,032, Mar. 11, 1982, Pat. No. 4,434,641.

[51] Int. Cl.[5] ..... B21D 51/44; B65D 8/08; B65D 17/00

[52] U.S. Cl. ..... 220/66; 72/379; 220/270; 413/8

[58] Field of Search ..... 220/66, 67, 268, 269, 220/270; 413/8; 72/379

[56] References Cited

U.S. PATENT DOCUMENTS

| | | | |
|---|---|---|---|
| 1,690,917 | 11/1928 | Wilcox . | |
| 2,763,228 | 9/1956 | Lawson . | |
| 3,406,866 | 10/1968 | Jasper | 220/66 |
| 3,434,325 | 3/1969 | Podesta et al. . | |
| 3,441,170 | 4/1969 | Khoury | 220/66 X |
| 3,537,291 | 11/1970 | Hawkins . | |
| 3,774,801 | 11/1973 | Gedde | 220/270 |
| 3,894,652 | 7/1975 | Brown | 220/270 |
| 3,902,626 | 9/1975 | Jordan et al. . | |
| 3,977,341 | 8/1976 | Jordan et al. . | |
| 4,027,612 | 6/1977 | Herbst | 413/12 |
| 4,031,837 | 6/1977 | Jordan | 413/8 |
| 4,093,102 | 6/1978 | Kraska . | |
| 4,109,599 | 8/1978 | Schultz | 413/8 |
| 4,144,994 | 8/1978 | Brickeen, Sr. . | |
| 4,186,678 | 9/1978 | McConnellogue . | |
| 4,215,795 | 8/1980 | Elser . | |
| 4,217,842 | 8/1980 | di Luigi . | |
| 4,217,843 | 8/1980 | Kraska . | |
| 4,254,890 | 3/1981 | Westphal . | |
| 4,276,843 | 7/1981 | Hansen . | |
| 4,354,784 | 10/1982 | Westphal | 413/12 |
| 4,448,322 | 5/1984 | Kraska | 220/66 X |

FOREIGN PATENT DOCUMENTS

| | | |
|---|---|---|
| 4962972 | 6/1974 | Australia . |
| 2065009 | 6/1981 | United Kingdom . |

OTHER PUBLICATIONS

Letter from Ralph R. Rath to R. P. Campbell, dated 1/12/80.

(List continued on next page.)

*Primary Examiner*—Allan N. Shoap
*Attorney, Agent, or Firm*—Gilbert E. Alberding

[57] ABSTRACT

The present invention relates to improvements in the strength of ends used on metal beverage containers.

Such ends generally comprise a central panel portion of a substantially planer character, a surrounding U-shaped sidewall having inner and outer legs, a curved intermediate portion integrally joining the inner leg to the U-shaped sidewall, and a peripheral curl extending from the outer leg for double seaming the end onto a can body.

In accordance with the present invention, the intermediate portion and adjacent central panel portion are firmly supported by a die while a clamping force is placed on an annular band of the upper surface of the end at the intermediate portion. The clamping force is increased until metal flows inwardly and outwardly from the contact point resulting in a free compression doming of the center panel and an outward deflection of the inner leg. An end of increased buckle resistance is thereby produced which end is approximately within standard dimensions such that customers can use the end on existing seaming equipment without alteration. An optional feature is provided to minimize the compression doming by clamping a peripheral band of the end with a hold-down pad while the metal flowing is accomplished. This reduces the dome depth and results in a strengthened end having a dome depth very close to standard specifications.

8 Claims, 4 Drawing Sheets

OTHER PUBLICATIONS

Letter from Ralph R. Rath to R. P. Campbell, dated 2/18/88.
Letter from Robert A. Stengel to Gilbert E. Alberding, dated 4/25/88, Memo from R. D. Zenger to R. A. Stengel, dated 2/15/88.
Attachment 1-"The Battle of Pop Tops Goes On", Chicago Daily News, 11/12/76.
Attachment 2-American National Can Test Request Report 6-716, dated 1/3/77.
Attachment 3-American National Can Test Request Report entitled "Ball Claim of Patent Infringement-Coining O/S Ends".
Attachment 4-American National Can Test Request Report Entitled, "Ecology-End-ENTECH", Samples 06/12/78.
Attachment 5a-"The Pop-Top End", Food Technology in Australia, 6/77, pp. 233-234.
Attachment 5b-"The Pop Top End", Australian Packaging, 5/76, pp. 86-88.
Attachment 6-American National Can Test Request Report Entitled "Ecology Ends-BHP"; dated 5/20/77.
Attachment 7-American National Can Memo re Broken Hill, 3/8/76.
Attachment 8-American National Can Test Request Rpt. entitled "209 Kaiser AL Ends-DIE 5R", 05/12/76.
Attachment 9a-National Can Corporation Drawing ST-2-98, dated 11/5/85.
Attachment 9b-National Can Corporation Drawing DD-166-B, dated 7/12/78.
Attachment 9c-National Can Corporation Drawing DD-018-B, datd 3/4/77.
Memorandum from S. Misra re Dynamic III, ends at Birmingham, 3/27/81, EPO Search Report Appln. EP 84 11 2243.
Letter Dated May 12, 1987 of R. P. Campbell.
Letter Dated Nov. 6, 1987, from Frost & Jacobs.
Exhibit A-Stolle Drawing C-S0688 and Bill of Material BM-68672.
Exhibit B-Owens-Illinois Engineering Specifications Stolle Shipping Transmittals S-24803, S-23498.
Stolle Purchase Requisition S-17445, Stolle Purchase Order S-17445.
Owens-Illinois Drawing D-02000, Stolle Changes Drawing Dated 1979.
Exhibit C-Stolle Drawing C-94704.
Exhibit D-Kaiser Drawing CDT-B-3608-PE.
Exhibit E-Jos. Schlitz Drawing 32 WOA-9341.
Exhibit F-Stolle Drawing B-94964.
Exhibit G-Stolle Drawing D-81840.

BUCKLE RESISTANCE FOR METAL CONTAINER CLOSURES

Matter enclosed in heavy brackets [ ] appears in the original patent but forms no part of this reissue specification; matter printed in italics indicates the additions made by reissue.

This *is a continuation of Ser. No. 056,611 filed Jun. 1, 1987, now abandoned, which is a reissue of U.S. Pat. No. 4,577,774, issued Mar. 25, 1986, which issued from application Ser. No. 711,010 filed Mar. 12, 1985, which* is a continuation of application Ser. No. 565,995 filed Dec. 27, 1983, now abandoned, which is a division of application Ser. No. 357,032 filed Mar. 11, 1982, now U.S. Pat. No. 4,434,641 issued Mar. 6, 1984.

BACKGROUND OF THE INVENTION

The present invention relates generally to container ends and more particularly to an improved end for a pressurized container and method of forming such end.

Because of the very large market for beer and beverage cans and the very competitive pricing of such containers it is important that such cans, including their ends, be made as economically as possible. A significant portion of the manufacturing cost of such ends is represented by the metal. As is well appreciated by those skilled in the art, even a minute metal saving in each end may result in millions of dollars in savings to the can industry due to the billions of ends produced. Therefore, a relatively small reduction in the thickness of metal while maintaining the strength of the end is of significant economic importance. Conversely, an increase in strength using the same thickness of metal is also of great importance.

The configuration of ends conventionally used to close drawn and ironed beer and beverage cans comprises a central panel surrounded by a generally U-shaped sidewall integrally joined to the central panel by a convexly curved intermediate section. The outer leg of the side wall is provided with a reverse curl at its upper end which is double seamed onto the flange of the container. After seaming the outer leg is substantially parallel with the sidewall of the can while the inner leg of the sidewall is disposed inwardly at an angle.

It has been recognized that having the two legs of the U-shaped sidewall substantially vertical and increasing the panel height increases the buckle strength of the end. Thus in U.S. Pat. No. 4,217,843 there is disclosed tooling for forming the sidewall in such a manner that the legs are more nearly vertical and the panel height is greater than was previously the case. It is also known that doming the central panel provides increased buckle strength. As shown in U.S. Pat. No. 4,217,843 this is normally done at the last forming station for making can ends by tension stretching the panel portion of the end with a doming tool having the desired radius of curvature. Other doming techniques proposed include that shown in U.S. Pat. No. 3,441,170 where the curved segment connecting the inner leg of the sidewall to the central panel is coined on the undersurface. This is for the purpose of reducing the metal thickness in the intermediate segment to the point where it functions as a hinge thus enabling the panel portion to dome as a result of the pressure of the contents of the can. Coining the undersurface of the curved segment but approximately to a lesser depth is also taught in the aforementioned U.S. Pat. No. 4,217,843 for the purpose of work hardening and thus stiffening the segment.

SUMMARY OF THE INVENTION

According to the present invention, a container end of the usual type is strengthened by selectively working a portion of the metal in the curved intermediate segment in such a manner as to cause a free doming of the central panel portion and a permanent deflection toward the vertical of the inner leg of the end sidewall. The upper surface of the metal is worked so as to permit a greater and more controlled flow of metal to enhance the free doming of the central panel portion, and also to prevent puncturing the corrosion resistant coating on the bottom of the end which is applied to the metal before the end is formed.

More specifically, an annular band of metal in the intermediate segment and about the periphery of the panel portion is progressively thinned by applying pressure to the upper surface of the metal to form an annular stiffened flange about the periphery of the central panel. The metal is thinned to the point where a substantial amount of metal is flowed radially inwardly and outwardly from the inner and outer diameter of the band immediately adjacent the upper surface. The inner flow compresses the central panel portion of the end, which is free to move, and causes it to dome to a stabilized compressed configuration. The outer flow permanently deflects the inner leg, which is free to move, of the sidewall outwardly and decreases the angle thereof to the vertical. Thus, in accordance with the present invention a stronger end results from the individual and combined effects of the compression doming, the annular stiffening flange, and the decreased angle of the one leg of the sidewall.

A particular advantage of the present invention is its applicability to the great majority of now produced lightweight closures without significantly altering the aesthetic characteristics or the dimensional standards of such closures thereby requiring minimal or no alterations in customers handling equipment.

As mentioned above, the prior art teaches that by increasing the panel height and straightening the panel wall to almost vertical, greater buckle resistance may be achieved. A major drawback of following such teachings is that a necessary corollary is that the tab will be forced above the chime at corresponding lower pressures due to the decreased dome depth. For example, in U.S. Pat. No. 4,217,843 increased buckle strength is partially achieved by increasing panel height. A rock resistance of 60 PSI then results. With the present invention, standard dimensions on panel height are substantially maintained, yet a rock pressure of 80 PSI is obtained with ring pull closures.

Accordingly, it is an object of the present invention to provide a method of increasing the buckle resistance and rock pressure of a closure.

It is another object of the present invention to provide a closure of thinner metal stock yet which substantially conforms to standard dimensions, buckle resistance and rock pressure thereby providing metal savings and compatibility with presently used customers sealing equipment.

It is yet another object of the present invention to provide a method of increasing the strength of a standard closure through a single additional working step which is easily instituted in most conventional conversion presses.

DETAILED DESCRIPTION

Figure 1:
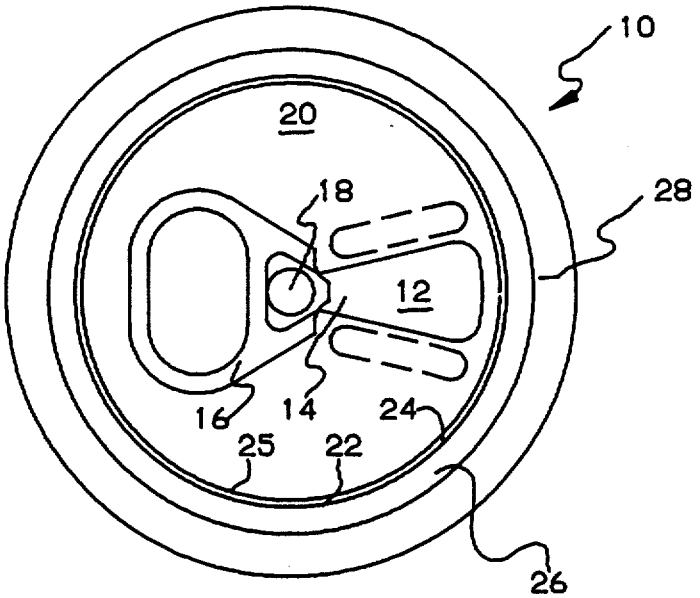
PRIOR ART FIG. 1
FIG. 1 is a top view of a standard end.

With reference now to the drawings there is shown in FIG. 1 a metal container end 10 of the easy open type. The end 10 is of conventional construction and is provided with a tear portion 12 defined by a score line 14. As is customary, the tear portion is removed by means of a pull tab 16 functionally connected to the tear portion 12 by the usual rivet 18.

Figure 2:
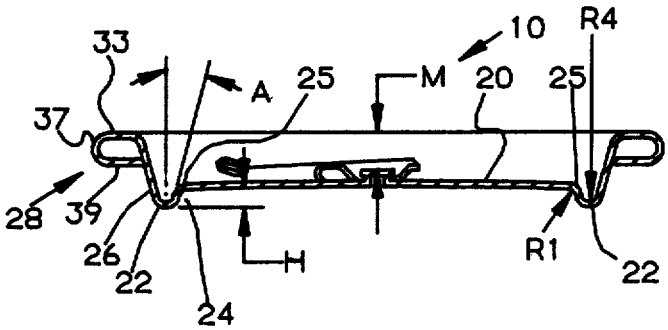
PRIOR ART FIG. 2
FIG. 2 is a cross-sectional view of the standard end of FIG. 1.

As more clearly shown in FIG. 2, the end 10 includes a central substantially flat panel portion 20 surrounded by a generally U-shaped sidewall 22 having a radius of curvature R4 and comprising inner and outer legs respectively referenced 24 and 26. The uppermost extremity of the outer leg terminates in the conventional curl 28 having a flat top portion 33, a curved section 37 and a terminal end 39 which is turned inwardly upon the flange of the can to be sealed in the typical double seaming operation. The innermost leg 24 extends upwardly and inwardly from the vertical at an angle A and is joined to the panel portion 20 by a convexly curved intermediate section 25 having a radius of curvature R1. The end has a dome depth M measured from the rivet to uppermost portion of the curl 28 and a panel height H, measured from the bottom of the U-shaped sidewall 22 to the bottom of the panel portion 20 adjacent the curved intermediate section 25.

There are generally two types of standard ends commercially produced for beverage containers, albeit in a variety of configurations, the retained tab end and the ring pull end. Again generally speaking, the production process for the basic shell configuration including the central panel, U-shaped sidewall, intermediate section, inner and outer legs, and the curl may be the same for both styles of ends with the main difference being in the conversion process where the tab and opening portion are formed. Due to the similarity in basic shell configuration, improvements in strength to one type of end which result from some change in the basic shell configuration are generally also applicable to the other basic type of end. One parameter, however, which is of greater concern when dealing with retained tab ends is that of dome depth which is highly related to rock pressure. As those skilled in the art will recognize, retained tabs are generally thicker than ring pull tabs and therefore, extend above the central panel a greater distance. Therefore, dome depth, as measured from the top of the rivet 18 to the top of the curl 33, must be greater on such ends than on ring pulls to obtain similar rock pressures and to make sure the tab does not extend above the curl in normal use. Due to the above, many manufacturers tension dome ring pull ends to obtain the slight increase in strength which results, yet do not dome retained tabs.

Another parameter which dome depth effects is stackability. Preferably ends stack such that the upper substantially flat surface 33 of the curl provides a stable base for the terminal end 39 of the curl of the above stacked end. Should dome depth be too small, or conversely, dome height be too great, the tab may interfere with the bottom dome of the above stacked end. This may result in a reduction in the number of closures which can be stacked per linear unit of measurement to an out of specification figure and more importantly, may be a source of problems with some customers seaming equipment due to potential rocking between stacked closures on the heightened tab, rather than the preferred closely stacked stable configuration. This is especially true with the thicker retained tabs.

As previously stated it has been proposed to strengthen the end by coining the undersurface of the intermediate section 25 with the prior teachings differing in the degree of coining. In accordance with the present invention the strength of the end 10 is increased by working the metal in the intermediate segment 25 in such a manner as to form a strengthened peripheral flattened flange about the central panel portion. In addition, the metal is worked in a manner such as to cause free doming of the panel portion and outward deflection of the leg 24 thus also increasing the strength of the end.

An added feature of the present invention is the ability to strengthen the end while keeping the end substantially within specification for tension domed ends, especially with respect to dome depth and panel height. This makes ends formed in accordance with the present invention completely compatible with existing customers fill and seal equipment including maintaining a rock pressure of 80 PSI with ring pull ends. Also, when the optional feature of a holddown pad is employed, the stackability of retained tab ends so formed remains identical to undomed standard retained tab ends, as noted above, an important feature with some customers existing seaming equipment.

Figure 3:
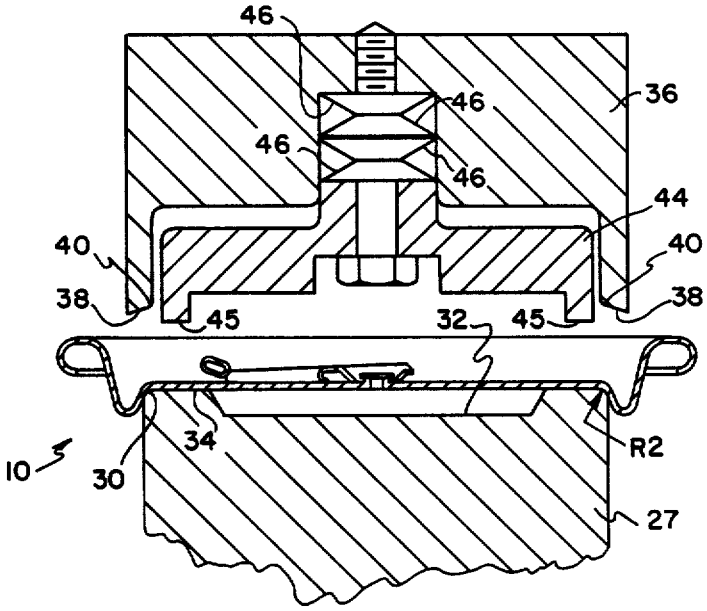
FIG. 3 is a cross-sectional view of apparatus manufactured in accordance with the present invention, in the non-working configuration.

As shown in FIG. 3, prior to working the metal in the intermediate segment and the immediately adjacent center panel, the undersurface of the end is supported by a die 27 having a convexly curved peripheral shoulder 30 having a radius of curvature R2 substantially equal to that of the intermediate segment 25. The die has a recessed central portion 32 and a metal contacting surface 34 which in effect provides an annular band of support for the undersurface of the panel 20 and the intermediate segment 25. As thus supported, the end 10 as a whole is restrained from lateral movement while the panel 20 is free to move upwardly and the sidewall 22 including the leg 24 is free to move laterally.

In order to work the metal, a punch 36 having an annular metal working surface 38 is positioned above the end 10 and aligned for axial movement with both the end and the die 27. In one embodiment, the metal working surface 38 over the major portion of its effective cross-sectional width is substantially flat and disposed in a plane substantially parallel to the plane containing the upper surface of metal contacting surface 34 of die 27 as better shown in FIG. 5. In the alternative embodiments of FIGS. 6 and 7, for reasons which will be further explained, the metal working surface 38 is disposed in an upwardly sloped plane in the radially inward direction forming a frustoconical metal working surface. In both embodiments, the metal contacting surface 38 curves upwardly at its innermost end to provide a convexly curved shoulder portion 40 having a radius of curvature R3.

In accordance with an optional feature of the present invention, a hold-down pad 44 may be used to minimize the compression dome which is formed in accordance with the present invention to maintain the dome depth closer to standard end specifications. The hold-down pad is located in the center of the punch and has a flat annular clamping surface 45 and a series of spring washers 46 which allow a predetermined amount of biasing to be placed on the end 10 to minimize the compression doming.

Figure 6:
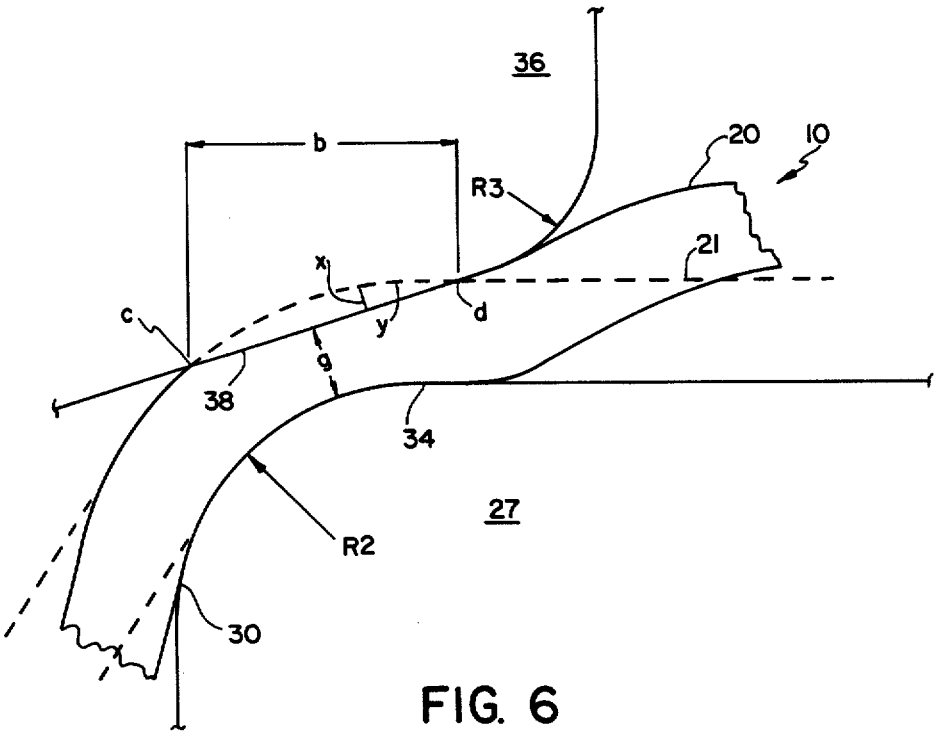
FIG. 6 is an enlarged view of the intermediate section and adjacent center panel of an end being worked in accordance with an alternative embodiment of the present invention.
Figure 7:
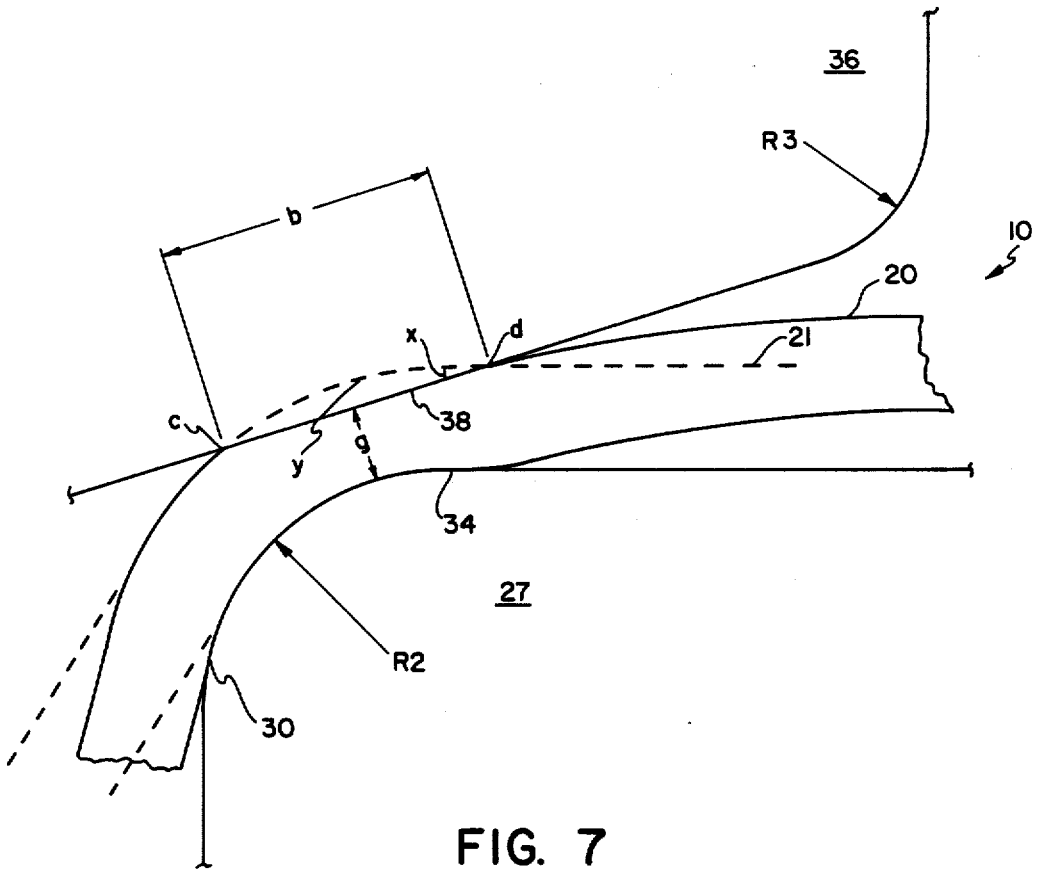
FIG. 7 is an enlarged view of the intermediate section and adjacent center panel of an end being worked in accordance with yet another alternative embodiment of the present invention.

An alternative to the hold-down pad is illustrated in the embodiment shown in FIG. 7. As is there illustrated, the fructoconical clamping surface 38 extends inwardly, thus limiting the height of the dome to below the surface 38, therefore performing a like function to the hold-down pad i.e., minimizing the height of the compression dome. As will be further explained, ends formed with the extended clamping surface 31 of FIG. 7 exhibit similar dome depths to ends formed with the clamping surface of FIGS. 5 and 6 where a hold-down pad is also employed.

Figure 4:
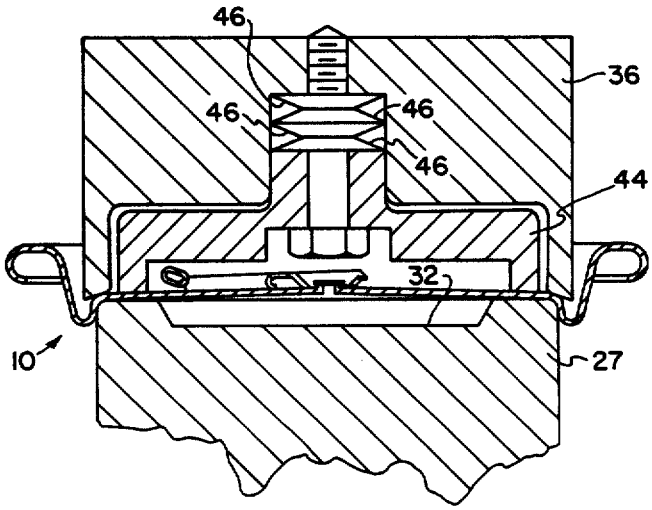
FIG. 4 is the apparatus of FIG. 3 in the working configuration.

In operation, the punch 36 is moved downwardly from the first position of FIG. 3 to the second metal working position illustrated in FIG. 4. As better shown in FIG. 5, 6, and 7, where dashed lines 21 represent the end prior to being worked by the punch, when the metal contacting surface 38 first contacts the upper surface y of the intermediate section 25, the end 10 is clamped between the surface 38 and the die 27 about only a peripheral band b. Band b has an initial outer diameter of c and an initial inner diameter d. As thus initially clamped, the inner leg 24 and the central panel portion 20 are free to move as will be subsequently explained. Further downward movement of the die compresses the metal beneath the surface y and progressively increases the width of the annular band b thus increasing the outer diameter c and decreasing the inner diameter d until the band b has a width defined by new outer diameter c and inner diameter d. In the embodiment illustrated in FIG. 5, the expanded compressed band extends inwardly and outwardly from the original periphery x of the central panel portion and results in a strengthened compressed cold worked peripheral band. In the embodiments illustrated in FIGS. 6 and 7, the majority of the expanded compressed band extends outwardly from the original periphery x of the end portion. In all embodiments as the width of the band is progressively expanded due to downward movement of the punch 36, an annular segment of metal immediately beneath the surface y is progressively displaced and caused to radially flow both inwardly and outwardly. The inner flow of metal compresses the central panel portion 20 which is confined and thus causes a free forming thereof into the compressed domed configuration shown in FIGS. 5, 6 and 7. The outer flow of metal causes the inner leg 24, which is free to move, to permanently deflect outwardly toward the outer leg 26.

When the optional hold-down pad 44 is also employed, the hold-down pad first contacts the central panel inwardly of the portion which is to be worked by metal working surface 38. Preferably only an outer annular band on the surface of the central panel portion is contacted by the hold-down pad. The hold-down pad's annular clamping surface 45 then clamps the end against the dies metal supporting surface 34. This minimizes the doming of the center panel and increases the outward deflection of the inner leg 24 of the end. The major portion of the center panel, however, is still unrestrained and allowed to free dome as a result of the expanded compressed band of metal formed around the periphery of the end. It has been found that the hold-down pad should optimumly place about 400 pounds of clamping force on the end. Greater force has been found to reduce the buckle and rock strength of the end while lesser force will not keep the dome depth sufficiently in specification resulting in potential stacking problems when working with retained tabs on some customers equipment. The desired 400 pounds of clamping force is preferably administered by choosing appropriate spring washers 46 in conjunction with the metallic hold-down pad illustrated in FIGS. 3 and 4. However, satisfactory results have also been obtained with a plug of an elastomeric substance exhibiting a durometer reading of between about 40 and about 80 in place of the illustrated metallic hold-down pad. The elastomeric substance is preferably urethane with a circular plug configuration. Sufficient clearance must be provided between the outside of the plug and the inner diameter of the punch to allow for outward deformation of the elastomeric substance.

A similar result to a hold-down pad is obtained when using the extended clamping surface illustrated in FIG. 7. As the annular band of metal is expanded and compressed by the downward motion of the clamping surface, the extended portion of the clamping surface contacts the peripheral portion of the central panel and restrains such portion to a reduced degree of upward doming. This limits the free compression doming approximately to the same degree as the hold-down pad. Although the extended clamping surface 31 of FIG. 7 is advantageous in it is similar in operation to a hold-down pad yet requires none of the extra moving parts, it is not practical for use with many standards ends presently produced. Some ends now produced, especially of the retained tab variety, have protrusions near the periphery of the central panel in conjunction with the design of the tear open tab. These protrusions must not be altered in the forming process of the present invention. Therefore, the extended clamping surface of FIG. 7 is not suitable for such ends, at least not without appropriate relief in the surface for the protrusions, which would require costly machining due to the frustoconical configuration of the surface. Satisfactory results have been obtained with such ends through the use of a hold-down pad constructed of a urethane elastomeric exhibiting a durometer reading of about 50. Similar results have also been obtained with a hold-down of the type shown in FIGS. 3 and 4 having appropriate relief spots in its clamping surface 45.

Figure 5:
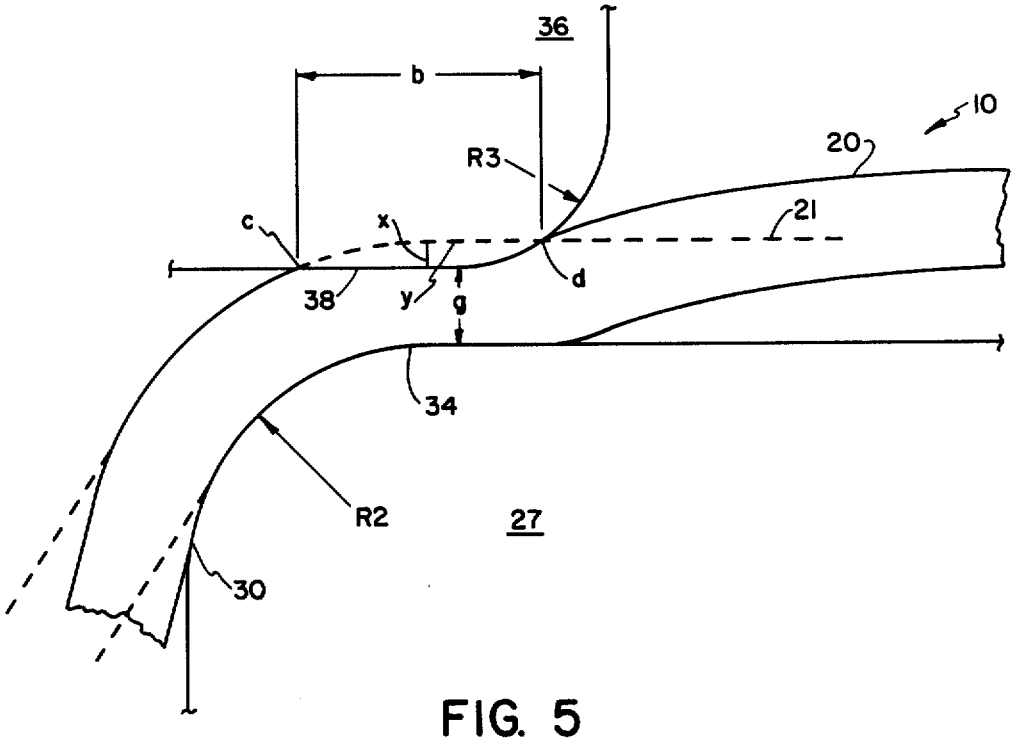
FIG. 5 is an enlarged view of the intermediate section and adjacent center panel of an end being worked in accordance with one embodiment of the present invention.

A number of 207.5 size closures have been made in accordance with the present invention from aluminum alloy stock having a nominal thickness of between 0.0120 and 0.0125 inches and a yield strength of between about 42 KSI and 45 KSI with buckle strengths in excess of 90 PSI and on ring pull ends, rock pressures in excess of 80 PSI. As mentioned above, retained tabs extend above the central panel a greater distance than ring pull tabs and exhibit reduced rock pressures. However, ends made by the method of the present invention, regardless of the type of tab, exhibit commensurate buckle strength and rock pressures to standard tension domed ends formed from 0.0130 aluminum stock. Considering FIGS. 5,6 and 7 again, optimum buckle results have been obtained where band b has a final width of between about 0.020 inches and about 0.040 inches. The residual g referenced in FIGS. 5, 6 and 7 is defined as the thickness of the flattened flange at its point of minimum thickness. In general terms, the greater the reduction in thickness or put otherwise, the smaller residual g, the greater the increase in buckle strength. However, a residual under about 0.006 inches results in a catastrophic failure mode under pressure, rather than a buckle, with the center panel fracturing around the flattened flange and physically separating from the container, an unacceptable happenstance for obvious reasons.

The preferred embodiments of the present invention maintain a residual g between about 0.006 inches and 0.011 inches wherein a buckle strength of at least 90 PSI will be obtained with 0.0125 inch stock, yet the catastrophic failure mode should not be a problem.

Presently, the embodiments illustrated in FIGS. 6 and 7 are the preferred commercial embodiments of the present invention. The frustoconical forming surface 38 of punch 36 provides a like surface on the compressed cold worked peripheral band b. This configuration blends well with the existing radius making the annular worked band difficult to detect by the consumer. Further, although buckle and rock resistance are commensurate to that obtained with the embodiment illustrated in FIG. 5, a lesser volume of metal is displaced in forming for a given residual thereby further minimizing the compression dome and remaining closer to specification on dome depth. This is because the residual only exists at the cross-sectional point of dotted line 35 in FIGS. 6 and 7. The residual of the embodiment of FIG. 5 is over the major portion of the worked band b. Also, preliminary experimentation has indicated that the embodiment of FIGS. 6 and 7 will withstand a smaller residual without catastrophic failure, a result which is attributed to the smoother transitions between the flattened flange area and the central panel.

Figure 8:
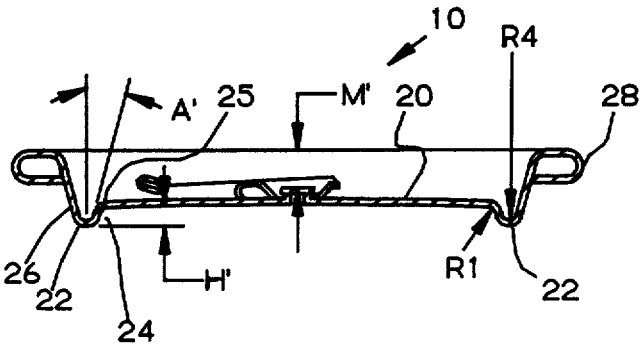
FIG. 8 is a cross-sectional view of an end produced by the present invention.

Referring to FIG. 2, the typically standard end when tension domed in accordance with the prior art has a dome depth m of between about 0.084 and 0.104 inches, a panel height h of about 0.066 inches and an inner leg angle with vertical A, of about 26°. FIG. 8 illustrates an end formed in accordance with the present invention. It has a panel height h' of about 0.069, a dome depth m' of, if no hold-down pad is used, between about 0.060 and 0.070 inches, an inner leg angle with vertical A' of, if no hold-down pad is used, about 22°. Where a hold-down pad or the embodiment of FIG. 7 is employed, panel height h' remains at about 0.069, some depth m' increases to between about 0.080 inches and 0.090 inches, and angle A' decreases to about 20°. It should be noted that absolute angles for inner leg 24 are extremely difficult to measure and it is perhaps of greater accuracy to state that angle A' is between about 2° and about 4° smaller than A without a hold-down pad and between about 5° and about 7° smaller than A with a hold-down pad. Also, dome depth m' for ends worked in accordance with the present invention is highly dependent upon the residual g. The smaller the residual, the greater the volume of metal displaced inwardly and correspondingly, the greater the dome. Obviously, the greater the dome, the smaller m'. The above figures on m' are given for a residual of about 0.008 inches. Roughly, empirical results indicate a decrease of about 0.005 inches in dome depth for every decrease of about 0.001 inches in residual g. The increase in dome depth attained through the use of a hold-down pad is substantially dependent on the pressure exerted on the end. Empirical results indicate that with 400 pounds of pressure, an increase in dome depth of between about 0.015 and 0.020 inches can be expected for a given residual.

Although the mechanism by which buckling takes place is not completely understood it is thought that in the initial stages, the inner panel wall is forced outwardly at some circumferential point. The present invention is thought to increase buckle resistance by imparting a precise degree of strain hardening at the flattened flange area which adds rigidity to the intermediate section and inwardly to the central panel. The increased rigidity of the intermediate section is thought to help prevent the outward deflection of the inner leg thereby delaying the first stage of buckling until higher pressures are reached. There is also a measurable straightening of the inner leg toward vertical which is thought to add some degree of buckle resistance.

Although the present invention may be applicable to a variety of situations, commercially it is preferably implemented in the final stage of the conversion press. Many can manufacturers now, in accordance with the prior art, tension dome ends at the last stage of the conversion press. It is a relatively simple matter to replace the existing tension dome tooling with tooling constructed in accordance with the present invention.

This will result in ends produced which have a substantial increase in strength over prior art tension domed ends yet are very close in dimensional characteristics to such ends thereby requiring minimal or no other changes in manufacturing existing equipment, and perhaps more importantly, no changes in customers existing filling and seaming equipment. Most manufacturers will prefer to use the present invention in conjunction with the production of thinner gauge ends thereby realizing substantial cost savings in materials. This will result in the production of ends having similar strength and dimensional characteristics to the priorly produced ends, yet of a thinner metal gauge.

In the broadest terms then, the present invention contemplates the production of stronger ends or, ends of thinner stock having the same strength and dimensional characteristics as priorly produced ends of thicker stock, by forming an expanded area of compressed metal near the periphery of the central panel portion of the end. This is accomplished by supporting the undersurface of the end over the intermediate portion and the periphery of the central panel portion and progressively thinning the metal by applying pressure to the top surface of the intermediate portion thereby flowing metal inwardly to compression dome the end and outwardly to permanently deflect the inner leg to a more vertical configuration. Optionally, to further place the end in prior art specifications for tension domed ends, the compression dome may be minimized by either clamping a minor portion of the central panel down with a hold-down pad prior to flowing metal or by using a working tool with an extended frustoconical contact surface which progressively restrains the peripheral portion of the central panel from upward movement simultaneous to the metal flow. Preferably the end produced in accordance with the present invention will have a peripheral flange of expanded compressed metal between about 0.020 and about 0.040 inches in width with a residual of between about 0.006 and 0.011 inches and a panel height of under 0.075 inches.

What is claimed is:

1. A metal closure comprising a circular domed central panel portion, a generally U-shaped sidewall having inner and outer upstanding legs, and an intermediate curved section integrally connecting said panel portion to said inner leg adjacent to the upper extremity thereof, said intermediate curved section having a thinned annular band of cold flowed metal formed therein immediately adjacent the upper surface thereof wherein said annular band of cold flowed metal is a frustoconical surface which angles upward and away from the horizontal in the radially inward direction and the lower surface of said intermediate curved section immediately opposite said thinned annular band of cold flowed metal is of an arcuate concave configuration, said thinned annular band being compressed cold worked and defined by a flat surface having a width of between about 0.020 and about 0.040 inches, the flow of said metal of said thinned annular band being sufficient resulting in said panel portion of said metal closure being domed axially outwardly and said inner leg being deflected towards a substantially vertical configuration.

2. A metal closure comprising a circular domed central panel portion, a generally U-shaped sidewall having inner and outer upstanding legs, and an intermediate curved section integrally connecting said panel portion to said inner leg adjacent to the upper extremity thereof, said intermediate curved section having a thinned annular band of cold flowed metal formed therein immediately adjacent the upper surface thereof wherein said annular band of cold flowed metal is straight and substantially parallel to the horizontal and the lower surface of said intermediate curved section immediately opposite said thinned annular band of cold flowed metal is of an arcuate concave configuration, said thinned annular band being compressed cold worked and defined by a flat surface having a width of between about 0.020 and about 0.040 inches, the flow of said metal of said thinned annular band being sufficient resulting in said panel portion of said metal closure being domed axially outwardly and said inner leg being deflected towards a substantially vertical configuration.

*3. A metal closure comprising a circular domed central panel portion, a generally U-shaped sidewall having inner and outer upstanding legs, and an intermediate curved section integrally connecting said panel portion to said inner leg adjacent to the upper extremity thereof, said intermediate curved section having a thinned annular band of cold flowed metal formed therein immediately adjacent the upper surface thereof wherein said annular band of cold flowed metal is a frustoconical surface which angles upward and away from the horizontal in the radially inward direction and the lower surface of said intermediate curved section immediately opposite said thinned annular band of cold flowed metal is of an arcuate concave configuration, said thinned annular band being compressed cold worked and defined by a flat surface, the flow of said metal of said thinned annular band being sufficient resulting in said panel portion of said metal closure being domed axially outwardly and said inner leg being deflected towards a substantially vertical configuration.*

*4. A metal closure comprising a circular domed central panel portion, a generally U-shaped sidewall having inner and outer upstanding legs, and an intermediate curved section integrally connecting said panel portion to said inner leg adjacent to the upper extremity thereof, said intermediate curved section having a thinned annular band of cold flowed metal formed therein immediately adjacent the upper surface thereof wherein said annular band of cold flowed metal is straight and substantially parallel to the horizontal and the lower surface of said intermediate curved section immediately opposite said thinned annular band of cold flowed metal is of an arcuate concave configuration, said thinned annular band being compressed cold worked and defined by a flat surface, the flow of said metal of said thinned annular band being sufficient resulting in said panel portion of said metal closure being domed axially outwardly and said inner leg being deflected towards a substantially vertical configuration.*

*5. A metal closure comprising a circular domed central panel portion, a generally U-shaped sidewall having inner and outer upstanding legs, and an intermediate curved section integrally connecting said panel portion to said inner upstanding leg adjacent to the upper extremity thereof, said metal closure having a thinned annular band of cold flowed metal formed thereon immediately adjacent the outer upper surface of said intermediate curved section, the lower surface thereof immediately opposite said thinned annular band having an arcuate concave configuration, said thinned annular band being formed by the process of restraining said central panel against lateral movement and cold flowing metal from the upper surface of said intermediate curved section radially inwardly to form a substantially flat surface immediately opposite said arcuate concave configuration, said flat surface angling upwardly and away from the horizontal in the radially inward direction and to compression dome the panel portion slightly upwardly and by cold flowing metal outwardly to deflect the inner upstanding leg in a substantially vertical configuration while the central panel is restrained.*

*6. A metal closure comprising a circular central panel portion, a generally U-shaped sidewall having inner and outer legs, and an intermediate curved section integrally connecting said panel portion to said inner leg, said metal closure having a thinned annular band of cold flowed metal formed thereon adjacent the upper surface of said intermediate curved section, the lower surface thereof immediately opposite said thinned annular band having an arcuate concave configuration, said thinned annular band being formed by the process of restraining said central panel and cold flowing metal from the outer surface of said intermediate curved section radially inwardly to form a substantially flat surface immediately opposite said arcuate concave configuration, said flat surface angling upwardly and away from the horizontal in the radially inward direction and to compression dome upwardly the panel portion.*

*7. A metal closure comprising a circular central panel portion, a generally U-shaped sidewall having inner and outer legs, and an intermediate curved section integrally connecting said panel portion to said inner leg, said metal closure having a thinned annular band of cold flowed metal formed thereon adjacent the upper surface of said intermediate curved section, the lower surface thereof immediately opposite said thinned annular band having an arcuate concave configuration said thinned annular band*

*being formed by the process of restraining said central panel and cold flowing metal from the outer surface of said intermediate curved section to form a substantially flat surface immediately opposite said arcuate concave configuration, said flat surface angling upwardly and away from the horizontal in the radially inward direction and to deflect the inner leg in a substantially vertical configuration the metal in the band being cold flowed in an amount sufficient to cause compression doming of the circular central panel portion.*

*8. A metal closure comprising a circular central panel portion, a generally U-shaped sidewall having inner and outer legs, and an intermediate curved section integrally connecting said panel portion to said inner leg, said metal closure having a thinned annular band of cold flowed metal formed on the outer upper surface of said intermediate curved section, the lower surface thereof immediately opposite said thinned annular band having an arcuate concave configuration, the metal in the band being cold flowed and defining a substantially flat frustoconical surface which angles upward and away from the horizontal in a radially inward direction, the circular central panel portion having an upwardly domed configuration.*

* * * * *